United States Patent

Nusshör

[11] Patent Number: 5,968,381
[45] Date of Patent: Oct. 19, 1999

[54] METHOD FOR THE MANUFACTURE OF A GAS BAG COVER USING LASER SCORING

[75] Inventor: Bernd Nusshör, Spraitbach, Germany

[73] Assignee: TRW Occupant Restraint Systems GmbH, Alfdorf, Germany

[21] Appl. No.: 09/115,850

[22] Filed: Jul. 15, 1998

Related U.S. Application Data

[62] Division of application No. 08/759,470, Dec. 5, 1996, Pat. No. 5,803,489.

[30] Foreign Application Priority Data

Dec. 13, 1995 [DE] Germany ............ 195 46 585

[51] Int. Cl.$^6$ .................................................. B23K 26/00
[52] U.S. Cl. ........................... 219/121.69; 219/121.85
[58] Field of Search ................ 219/121.69, 121.85; 264/400

[56] References Cited

U.S. PATENT DOCUMENTS

| | | | |
|---|---|---|---|
| 3,626,143 | 12/1971 | Fry | 219/121.69 |
| 5,013,065 | 5/1991 | Kreuzer . | |
| 5,335,935 | 8/1994 | Proos et al. | 280/731 |
| 5,632,914 | 5/1997 | Hagenow et al. | 219/121.71 |
| 5,744,776 | 4/1998 | Bauer | 219/121.7 |
| 5,882,572 | 3/1999 | Lutze et al. | 264/400 |
| 5,883,356 | 3/1999 | Bauer et al. | 219/121.62 |

FOREIGN PATENT DOCUMENTS

| | | |
|---|---|---|
| 299324 | 4/1990 | Japan . |
| 2171364 | 7/1990 | Japan . |
| 6100754 | 4/1994 | Japan . |
| 6144142 | 5/1994 | Japan . |
| 07228211 | 8/1995 | Japan . |
| 2276354 | 9/1994 | United Kingdom . |

OTHER PUBLICATIONS

Anonymous, "Integrated Passenger Side Inflatable Restraint Door with Laser–Generated Tear Seam," Research Disclosure, 35603, Dec. 1993.

Hecht, J., "The Laser Guidebook 2nd Edition,"McGraw Hill, New York, pp. 159–183, 1992.

*Primary Examiner*—Gregory Mills
*Attorney, Agent, or Firm*—Tarolli, Sundheim, Covell, Tummino & Szabo

[57] ABSTRACT

The invention relates to a gas bag cover for a vehicle occupant restraining system wherein said cover has a tear line extending from the inner side thereof as far as a predetermined residual wall thickness and to a method for the production thereof. The cover is characterized in that as a main component thereof it comprises one or more layers in a composite structure of a material selected from the group consisting of elastomer alloys of a thermoplastic polymer with a non-cross linked, partly cross-linked or completely cross-linked EPDM terpolymer, of block copolymers of alternating polyester and polyether blocks and of block copolymers of polystyrene and polyolefines, in that the residual wall thickness amounts to between 0.3 and 1 mm along the major part of the course of the tear line, and in that the tear line, starting from an inner side of the cover, steadily tapers toward an outer side thereof. The tear line is produced with the aid of a laser from the inner side of the cover.

17 Claims, 2 Drawing Sheets

METHOD FOR THE MANUFACTURE OF A GAS BAG COVER USING LASER SCORING

This application is a divisional application Ser. No. 08/759,470 filed on Dec. 5, 1996 now U.S. Pat. No. 5,803,489.

The invention relates to a gas bag cover for a vehicle occupant restraining system comprising a tear line inwardly extending from an inner side of the cover as far as a predetermined residual wall thickness and to a method for the manufacture thereof.

Gas bag covers of this type are presently manufactured using injection or other molding methods for plastics. Such covers are provided on the inner side thereof with a so-called tear line adapted to act as a line of intended weakness on activation of the gas bag and to render possible an outward folding of the cover. Accordingly the deploying gas bag is able to emerge and hinder impact of the vehicle occupant against the steering column, the dash or the windscreen.

The tear line is conventionally produced even during the manufacture of the cover with the aid of a special surface feature of the injection molding or foaming tool. In order to ensure a reliable method of manufacture, a minimum residual wall thickness is required which is dependent on the material of the cover. Such residual thickness is additionally controlling for the strength and dimensional stability of the cover in the installed condition. On the other hand a relatively thin residual wall thickness is also desired in order to ensure reliable bursting open of the cover by the gas bag in the process of deployment during an accident. In the case of covers produced by injection molding an excessively thin residual wall thickness however will result in tell-tale marks on the visible side of the cover betraying the presence of the tear line.

The German patent application DE-A 4,409,405 discloses a method for the production of an air bag cover, which comprises an inner molded layer of relatively hard polymer material and an outer layer of relatively soft polymer material. The cover is firstly manufactured with the aid of a conventional molding method. After this a tear line is made in the cover using a cutting technique, which does not exert any thrust on the cover. For this purpose use is particularly made of a laser, an ultrasonic knife or a hot knife. The cut is so made that it penetrates through the inner molded layer completely and preferably bites approximately 1 mm into the outer layer of relatively soft polymer material. The tear line is in this case approximately 0.3 mm wide. The inner molded layer is approximately 2 mm thick and the outer molded layer approximately 5 mm thick.

In the case of a cover designed in this manner there is the problem that reliable operation of the cover is not always ensured for the full working life of the vehicle.

In accordance with the invention a cover of the type initially mentioned is consequently provided, which is characterized in that as the main component thereof the cover has one or more layers in a composite structure of a material selected from the group consisting of elastomer alloys of a thermoplastic polymer with a non-cross linked, partly cross-linked or completely cross-linked EPDM terpolymer, of block copolymers of alternating polyester and polyether blocks and of block copolymers of polystyrene and polyolefines, in that the residual wall thickness amounts to between 0.3 and 1 mm along the major part of the course of the tear line, and in that the tear line, starting from an inner side of the cover, steadily tapers toward an outer side thereof.

The elastomer alloy of the thermoplastic polymer and the EPDM terpolymer consists essentially of two phases: a hard phase constituted by the thermoplastic polymer and a soft phase of EPDM terpolymer (ethylene-propylene-diene rubber). The thermoplastic polymer is preferably polypropylene.

During the production of the elastomer alloy, also referred to in the following as "TPE-O", small elastomer particles of EPDM terpolymer are evenly and finely dispersed in a matrix of the thermoplastic polymer, the EPDM terpolymer being present in a non-cross-linked form. The elastomer alloy, also referred to as "TPE-V" herein, consists of the same components as the TPE-O elastomer alloy, although the soft phase of EPDM terpolymer is partly or, respectively, completely cross-linked in the thermoplastic matrix. The term "completely cross-linked" is here understood to be a degree of cross-linking of over 95%, while "partly cross-linked" means a degree of cross-linking of up to 95%, preferably 90 to 95%.

The production of the TPE-V elastomer alloy takes place by intensive mixing of the starting components with the addition of cross-linking agents, preferably by dynamic vulcanization, the EPDM phase being cross-linked "in situ" during the mixing and dispersing process. This technique renders it practically possible to tailor the properties of the elastomer alloy, more particularly as regards the proportions, the degree of cross-linking and the distribution of the EPDM soft phase.

As materials for the air bag cover in accordance with the invention furthermore block copolymers, termed "TPE-E" in the following, are suitable, which comprise alternating hard polyester blocks and soft polyether blocks. The polyester blocks are in this case constituted by diols, preferably 1,4-butanediol, and dicarboxylic acids, preferably terephthalic acid. For the production of the block copolymers the polyester blocks are esterified with long-chain polyethers bearing terminal hydroxyl groups.

The block copolymers, referred in the following as "TPE-S", of polystyrene and polyolefines are characterized by their triple block structure of two thermoplastic polystyrene terminal blocks and one elastomer middle block of polyolefine. Preferably as TPE-S's use is made of styrene-butadiene-styrene block copolymers, styrene-isoprene-styrene block copolymers or styrene-ethylene-butylene-styrene block copolymers and hydrogenated derivatives thereof. In such "TPE-S" block copolymers the hard polystyrene segments constitute regions with a uniform material characteristic (domains), which act as spatial, physical cross-linking points for the flexible, soft polyolefine segments.

The cover in accordance with the invention furthermore comprises a tear line, at which the residual wall thickness along the major part of the course of the tear line amounts to between 0.3 and 1 mm. A residual wall thickness under 0.3 mm causes strength problems in the cover during the working life of the vehicle and may lead to premature or unintended rupturing of the cover. A residual wall thickness above 1.0 mm hinders rupturing of the cover and on emergence of the gas bag increases the load on the other parts of the cover, more particularly adjacent to the hinge. Preferably, the residual wall thickness adjacent to the end of the tear line adjacent to the hinge of the cover is increased in order to make sure of a regular end of the tearing action. Furthermore it is preferred for the residual wall thickness to be reduced in predetermined regions of the course of the tear line and to here obtain a regular start to the tear action and to facilitate the initiation of tearing. The selection of the positions of such predetermined region will be performed in a manner dependent on the desired contour of the tear line and the placement of the gas bag.

A further feature of the cover in accordance with the invention is that the tear line, starting from the inner side of the cover, steadily tapers toward the outer side or, respectively, visible side. Preferably the tear line is in cross section generally similar to a gaussian curve. This design of the cross section of the tear line ensures that tearing open of the cover takes place exactly along the predetermined line of intended weakness.

The width of the tear line will preferably amount to between 120 and 190 $\mu$m and more especially approximately 150 $\mu$m. The small width of the tear line ensures that the tearing open of the cover takes place exactly at the predetermined position. Moreover tell-tale marks produced by the tear line on the other side of the cover are completely prevented.

The production of a tear line with such a small width is not possible using conventional injection molding. The invention therefore also relates to a method for the production of a gas bag cover, in the case of which the tear line is produced using a laser. Preferably a $CO_2$ laser is utilized. A $CO_2$ laser is characterized more particularly by a high intensity of the resulting laser beam and the favorable wavelength of 10.6 $\mu$m, in the case of which there is full absorption by the plastic material to be cut. Furthermore a $CO_2$ laser has a high efficiency of 15 to 20% and for such performance only requires small cooling facilities.

In accordance with the invention the laser is operated in so-called "monomode". In such monomode operation the light beam from the laser possesses an approximately gaussian energy profile, i. e. the energy flow density or intensity of the laser beam is more intense in the center thereof. On the other hand the intensity of a laser beam in so-called "multimode" operation is approximately equal at all points in the cross section of the beam. Owing to monomode operation of the laser better focussing and higher cutting speeds are attained.

The combination in accordance with the invention of selected plastic materials for the gas bag cover, a predetermined residual wall thickness and a predetermined form of the tear line ensures optimum functional reliability of the cover during the entire working life of the motor vehicle and tends to prevent premature embrittlement of the cover adjacent to the tear line otherwise caused by frequent changes in temperature.

Further features and advantages of the invention will be gathered from the following description of particularly preferred embodiments thereof with reference to the accompanying drawings.

Figure 1:
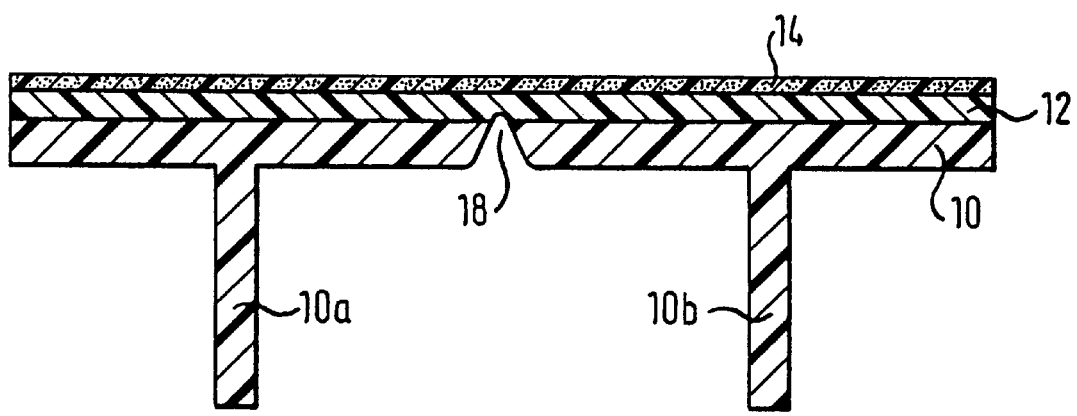
FIG. 1 shows a cross section taken through a two component gas bag cover.

The gas bag cover depicted in FIG. 1 comprises as its main part a core layer 10 and an external cover layer 12 of somewhat lesser thickness and bonded with the core layer. The two layers 10 and 12 are produced by injection in a mold, supports 10a and 10b being produced by injection molding at the same time on the layer 10. The supports serve for attachment of the cover to a steering wheel hub or, respectively, on a dash. The cover layer 12 is furthermore provided with a coating 14 of a two-component urethane paint system, which comprises an adhesion promotor and a covering paint. This paint system is characterized by an excellent resistance to scratching and abrasion and is conducive to providing a particularly pleasant feeling when the surface is touched.

In accordance with the invention a tear line 18 (shown on a larger scale here) is produced in the cover. The tear line preferably extends right through the core layer 10 and a part of the way through the external cover layer 12. Dependent on the materials utilized for the cover layer and, respectively, for the core layer, it is possible for the tear line to divide up only the core layer partly or completely. The production of the tear line 18 in the material is preferably performed with the aid of a $CO_2$ laser which is operated in monomode, the hot spot produced by the laser having a diameter (diameter of focussing) of approximately 120 to 190 $\mu$m and preferably approximately 150 $\mu$m at a divergence of approximately 5 mrad. Using this setting of the laser the tear line produced in the cover will approximately have the form of a gaussian curve in cross section.

The core layer 10 of the cover depicted in FIG. 1 essentially consists of a material selected from the group consisting of elastomer alloys of a thermoplastic polymer with a non-cross linked, partly cross-linked or completely cross-linked EPDM terpolymer and of block copolymers of alternating polyester and polyether blocks. The cover layer 12 may consist of the elastomer alloy of thermoplastic polymer and of partly or, respectively, completely cross-linked EPDM terpolymer, of block copolymers of polystyrene and polyolefine and of block copolymers of alternating polyester and polyether blocks. As the thermoplastic polymer polypropylene is preferably employed.

The thickness of the core layer is preferably within a range from approximately 2 to 4 mm, and the thickness of the cover layer is preferably in a range between approximately 1 and 3 mm. The core layer is preferably harder than the cover layer.

In accordance with a first embodiment the material of the core layer is produced from the elastomer alloy of a thermoplastic polymer and a non-cross-linked EPDM terpolymer (TPE-O) and the material of the cover layer is produced from a block copolymer of polystyrene terminal blocks and an elastomeric polyolefine middle block (TPE-S). In the case of a cover produced in this manner the residual wall thickness at the tear line cut in the cover amounts to between approximately 0.5 and 1.0 mm for most of the extent of the tear line.

In the case of a further embodiment of the two-component cover depicted in FIG. 1 the material of the core layer 10 is formed by an elastomer alloy of a thermoplastic polymer and a non-cross-linked EPDM terpolymer (TPE-O) and the material of the cover layer is formed by an elastomer alloy of a thermoplastic polymer and partly or, respectively, completely cross-linked EPDM terpolymer (TPE-V). In the case of such a cover structure the residual wall thickness preferably amounts to between approximately 0.5 and 1.0 mm.

In the case of a further embodiment of the cover depicted in FIG. 1 both the material of the core layer 10 and also the material of the cover layer 12 are produced from the elastomer alloy of a thermoplastic polymer and a partly or completely cross-linked EPDM terpolymer (TPE-V) of respectively different hardness. In this case the residual wall thickness preferably amounts to between approximately 0.5 and 0.8 mm. Lastly the material of the core layer 10 and of the cover layer 12 may be produced from a block copolymer of alternating polyester and polyether blocks. In this case the residual wall thickness is preferably approximately 0.3 to 0.5 mm.

Figure 2:
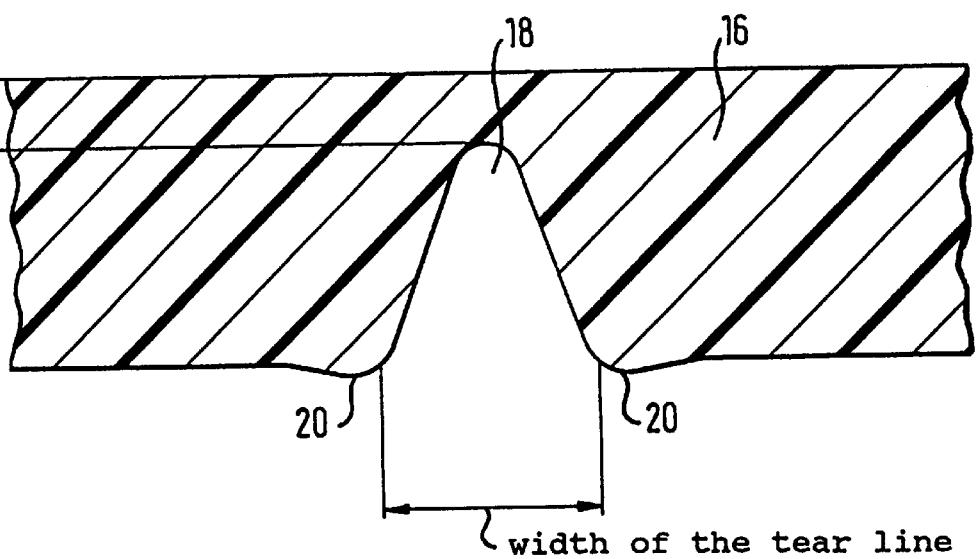
FIG. 2 shows a cross section through part of a one-component gas bag cover adjacent to the tear line.

FIG. 2 shows a partial cross section taken through the layer 16 constituting the main part of the one-component cover adjacent to the tear line 18. The production of the tear line 18 is done by cutting the inner side of the cover 16 with the aid of a laser. The width of the tear line is generally equal to the focus diameter of the laser beam produced and is, as measured on the inner side of the cover, preferably between approximately 120 and 190 μm. Owing to the use of a laser for the production of the tear line 18 such line has small humps 20 on its edge adjacent to the inner side of the cover, such humps not being taken into account in determining the width of the tear line. The tear line 18 shown here is approximately gaussian in cross section. The wall thickness adjacent to the tear line 18 (residual wall thickness) amounts to between approximately 0.3 and 1 mm. The thickness of the layer 16 is preferably in a range between 2 and 4 mm. Furthermore on its outer side the one-component cover 16 can be provided with a cover paint to improve the feel thereof when touched.

The layer 16 constituting the main part of the one-component cover in accordance with FIG. 2 preferably consists of a material selected from the group consisting essentially of the elastomer alloys of a thermoplastic polymer and a non-cross-linked, partly cross-linked or fully cross-linked EPDM terpolymer or of the block copolymers of alternating polyester and polyether blocks.

Preferably the material of the layer 16 is the elastomer alloy of a thermoplastic polymer and a non-cross-linked EPDM terpolymer (TPE-O), the residual wall thickness amounting preferably to between approximately 0.5 and 1.0 mm.

The material of the layer 16 may furthermore be the elastomer alloy of a thermoplastic polymer and a partly or fully cross-linked EPDM terpolymer (TPE-V). In the case of such a cover the residual wall thickness will preferably amount to between approximately 0.5 and 0.8 mm.

Finally the material for the layer 16 may be a block copolymer of alternating polyester and polyether blocks (TPE-E), the residual wall thickness being approximately 0.3 to 0.5 mm.

The cover in accordance with the invention is firstly produced using a conventional injection molding technique. Since the production of the tear line is carried out in a later method step, it is unnecessary to provide a special contour in the injection mold. Accordingly simpler tool design is possible. A further point is that jumps in the wall thickness caused by poor filling of the mold do not occur and there are no marks on the visible side of the cover opposite to the tear line.

Following injection molding the tear line is produced inwardly from the inner side of the cover using a laser as far as a predetermined residual wall thickness. The use of a laser renders possible a rapid and simple modification of the residual wall thickness and of the course of the tear line without involving any complex changes in the injection mold tool. Preferably a $CO_2$ laser is utilized, which is operated in monomode. In the case of such monomode operation the energy flux density or intensity of the beam from the laser is higher at the center of the beam's cross section than at the edges, the distribution of intensity corresponding approximately to a gaussian curve. In this mode of operation there is the advantage that a high speed of cutting and sharper focussing are possible. Accordingly the production of small and extremely small widths of tear line is rendered possible. The laser beam produced by the laser preferably possesses a focus diameter of approximately 120 to 190 μm and more especially approximately 150 μm, at a divergence of up to approximately 5 mrad.

I claim:

1. A method for the production of a gas bag cover for a vehicle occupant restraining system, said cover having an inner side and an outer side, said method comprising the steps of:

producing a focused beam with a laser, said focused beam having a higher energy density in the middle of a cross section of said beam than at the edges of said beam, and producing a tear line with the aid of said focused beam in the inner side of the cover, with said tear line inwardly extending from said inner side of the cover as far as a predetermined residual wall thickness and taking a course on said inner side of the cover, wherein said tear line has a width of between approximately 120 and 190 μm, as measured at said inner side of the cover, and steadily decreases in width as said tear line extends from said inner side of the cover toward said outer side thereof.

2. The method as claimed in claim 1, wherein the step of producing said focused beam includes using a $CO_2$ laser.

3. The method as claimed in claim 1, wherein the step of producing said focused beam includes producing said focused beam with a focus diameter of approximately 120 to 190 μm at a divergence of up to approximately 5 mrad.

4. The method as claimed in claim 1, wherein the step of producing said tear line includes cutting said tear line with a cross section in the form of a gaussian curve.

5. The method as claimed in claim 1, wherein the cover has, as a major constituent, one or more layers in a composite structure, each of said one or more layers being formed of a material selected from the group consisting of elastomer alloys of a thermoplastic polymer with a non-cross-linked, partly cross-linked or fully cross-linked ethylene-propylene-diene terpolymer, of block copolymers of alternating polyester and polyether blocks and of block copolymers of polystyrene and polyolefines.

6. The method as claimed in claim 5, wherein the material is the elastomer alloy made up of the thermoplastic polymer and the non-cross-linked ethylene-propylene-diene terpolymer, and wherein said residual wall thickness amounts to between 0.5 and 1.0 mm.

7. The method as claimed in claim 5, wherein the material is the elastomer alloy of the thermoplastic polymer and the partly cross-linked ethylene-propylene-diene terpolymer, and wherein said residual wall thickness amounts to between 0.5 and 0.8 mm.

8. The method as claimed in claim 5, wherein the material is the elastomer alloy of the thermoplastic polymer and the fully cross-linked ethylene-propylene-diene terpolymer, and wherein the residual wall thickness amounts to between 0.5 and 0.8 mm.

9. The method as claimed in claim 5, wherein the material is the block copolymer of alternating polyester and polyether blocks, and the residual wall thickness amounts to between 0.3 and 0.5 mm.

10. The method as claimed in claim 9, wherein the cover has, as a major constituent, at least one internally placed core layer and a cover layer molded on the core layer.

11. The method as claimed in claim 10, wherein the material of the core layer is the elastomer alloy of the thermoplastic polymer with the non-cross-linked ethylene-propylene-diene terpolymer and the material of the cover layer is the block copolymer of the polystyrene and a polyolefine, and wherein the residual wall thickness amounts to between 0.5 and 1.0 mm.

12. The method as claimed in claim 10, wherein the material of the core layer is the elastomer alloy of the thermoplastic polymer with the non-cross-linked ethylene-propylene-diene terpolymer and the material of the cover layer is the elastomer alloy of the thermoplastic polymer and the partly cross-linked ethylene-propylene-diene terpolymer, and wherein the residual wall thickness amounts to between 0.5 and 1.0 mm.

13. The method as claimed in claim 10, wherein the material of the core layer is the elastomer alloy of the thermoplastic polymer with the non-cross-linked ethylene-propylene-diene terpolymer and the material of the cover layer is the elastomer alloy of the thermoplastic polymer and the fully cross-linked ethylene-propylene-diene terpolymer, and wherein the residual wall thickness amounts to between 0.5 and 1.0 mm.

14. The method as claimed in claim 10, wherein the material of the core layer and of the cover layer is formed of the elastomer alloy of the thermoplastic polymer and the partly cross-linked ethylene-propylene-diene terpolymer, and wherein the residual wall thickness amounts to between 0.5 and 0.8 mm.

15. The method as claimed in claim 10, wherein the material of the core layer and of the cover layer is formed of the elastomer alloy of the thermoplastic polymer and the fully cross-linked ethylene-propylene-diene terpolymer, and wherein the residual wall thickness amounts to between 0.5 and 0.8 mm.

16. The method as claimed in claim 10, wherein the material of the core layer and of the cover layer is formed by a block copolymer of alternating polyester and polyether blocks, and wherein the residual wall thickness amounts to between 0.3 and 0.5 mm.

17. The method as claimed in claim 1, wherein said residual wall thickness amounts to between 0.3 and 1 mm along a major part of said course of said tear line.

* * * * *